United States Patent [19]
Iinuma

[11] Patent Number: 5,761,252
[45] Date of Patent: Jun. 2, 1998

[54] DIVERSITY RECEPTION DEVICE

[75] Inventor: Toshinori Iinuma, Gifu, Japan

[73] Assignee: Sanyo Electric Co., Ltd., Moriguchi, Japan

[21] Appl. No.: 441,993

[22] Filed: May 16, 1995

[30] Foreign Application Priority Data

May 16, 1994 [JP] Japan .................................. 6-101027
Sep. 27, 1994 [JP] Japan .................................. 6-231518

[51] Int. Cl.$^6$ .................................................. H04B 7/08
[52] U.S. Cl. ........................... 375/347; 375/349; 455/133
[58] Field of Search ................................. 375/264, 267, 375/283, 330–332, 347, 349; 332/304; 455/133–134, 140

[56] References Cited

U.S. PATENT DOCUMENTS

| | | | |
|---|---|---|---|
| 5,280,637 | 1/1994 | Larosa et al. | 455/134 |
| 5,321,850 | 6/1994 | Backstrom et al. | 455/139 |
| 5,461,646 | 10/1995 | Anvari | 375/347 |
| 5,465,271 | 11/1995 | Hladik et al. | 375/267 |

FOREIGN PATENT DOCUMENTS 3-27626  2/1991  Japan .

OTHER PUBLICATIONS

"High Frequency Closed–Space Diversity Antenna with Nulling Capability," William C. Y. Lee, et al., AP–S International Symposium 1985; Antennas and Propagation, Symposium Digest, Vancouver, BC, Jun. 1985, pp. 801–804.

"Postdetection Phase Combining Diversity," Masaharu Ikura, et al., IEEE Transactions on Vehicular Technology, May 1994, vol. 43, No. 2, pp. 298–302.

*Primary Examiner*—Young T. Tse
*Attorney, Agent, or Firm*—Armstrong, Westerman, Hattori, McLeland & Naughton

[57] ABSTRACT

A diversity reception device which weights in proportion to the reception level and combines a plurality of reception signals, includes a phase demodulator for demodulating the phase of the reception signal, a converter to output the sine and cosine elements of the reception signal, a sine element adder to add up sine element of each reception signal, and a cosine element adder to add up cosine element of each reception signal. The converter fetches and outputs predetermined values on sine and cosine elements of the reception signal upon input of the reception signal's reception level and phase data that is sent from phase demodulator. Therefore, the present device does not require expensive electronic circuits and can be made of small digital circuits suitable for IC including a memory.

3 Claims, 11 Drawing Sheets

DIVERSITY RECEPTION DEVICE

BACKGROUND OF THE INVENTION (1) Field of the Invention

This invention relates to a diversity reception device attached to radio transmission equipment, specifically to a diversity reception device that weights and combines a plurality of reception signals.

(2) Description of the Related Art

Currently, digital transmission equipment transmits the carrier signal modulated by the digital data signal (baseband signal) for effective data transmission. In modulating the carrier signal, several methods have been adopted such as: Amplitude Shift Keying (ASK) for varying the amplitude of the carrier signal according to the digital baseband signal (modulation signal); Frequency Shift Keying (FSK) for displacing the frequency of the carrier according to the modulation signal; Phase Shift Keying (PSK) for varying the phase of the carrier according to the modulation signal; and Quadrature Amplitude Modulation (QAM) for varying the amplitude and phase of the carrier independently according to the modulation signal.

It is well known that these digital modulation methods applied to mobile radio communication are affected by fading, a phenomenon caused by reflection or scattering of the electromagnetic wave, which seriously degrades the quality of the received signal. An effective method for supplementing reception level deterioration is the diversity reception which receives the signal over a plurality of lines.

Diversity reception is divided into the following types: Selection Combiner (SC) for selecting a signal with the highest reception level among the signals received in the plurality of lines before decoding; Equal-Gain Combiner (EGC) for combining all the received signals with equal level before decoding; and Maximal-Ratio Combiner (MRC) for weighting the received signals in proportion to each reception level and combining the signals before decoding.

Among the above three types, MRC most effectively combines the signals because the higher the reception level of the signal is, or the less noise-affected the signal is, the more weighted the signal is.

A conventioned MRC is explained below.

FIG. 1 shows a block diagram of conventional diversity reception equipment with MRC with four lines for receiving signals. In the device, input terminals 101 to 104 receive the signals and phase shifters 105 to 108 equally arrange the phases of the carriers adder 109 then combines the signals and decoder 110 decodes the combined signal. In the above process, adder 109 combines the signals in linear form because each signal has been amplified in linear form.

FIG. 2 shows an Inphase Quadrature plane figure representing how current transmission equipment combines signals. For the sake of convenience, it shows the case of combining two lines of signals.

S1 and S2 represent reception signals. S1S and S1N respectively represent a signal element and a noise element of S1. S2S and S2N respectively represent a signal element and a noise element of S2.

Generally, the level of each noise element is equal despite the size of received signal and the difference of receiving lines (hereinafter "branches"). That is why the reception signal in each branch is drawn as a point on the circumference with the same radius from signal elements S1S and S2S respectively (as |S1N|=|S2N|). In the diversity reception device with MRC in FIG. 1, signals received from each branch are combined in linear form, that is, S1 and S2 are combined as vectors, and the combined signal is input in the decoder.

However, since MRC requires a very high accuracy in synchronizing the carrier phases when combining the signals, convention reception devices with MRC tends to use an expensive Digital Signal Processor (DSP) to provide A/D convention of the received signal for digital processing. Also, for combining the signal in linear form, an A/D converter with a wide dynamic range is required. In short, a reception device with MRC has problems in its size and cost.

Although MRC may be a most preferable combiner under propagation conditions when there are only random disturbances, like thermal noise, since it merely combines the received signals in linear form, MRC has a defect in that it receives interference waves such as delay waves, without processing. In particular, when a large incidence of such waves is included in the signal received in a branch with high reception level, the signal is heavily weighted despite its bad quality, decreasing the receiving performance.

SUMMARY OF THE INVENTION

One object of the present invention, in consideration of the above mentioned problems, is to provide a diversity reception device with MRC in a simple configuration, comprising only small-scale digital circuits suitable for IC, including a memory and an adder.

The above object is achieved by a diversity reception device for weighting and combining a plurality of reception signals. The diversity reception device comprises: a plurality of phase demodulators for demodulating a phase of a respective one of the plurality of reception signals and outputting phase data consisting of a predetermined number of bits; a convertor having a first input port which receives the phase data, a second input port which receives a combination coefficient consisting of a predetermined number of bits, a first output port, a second output port, and a storage means, for outputting predetermined values stored in a place in the storage specified by a combination of the phase data and the combination coefficient, from the first output port and the second output port upon input of the phase data and the combination coefficient, the predetermined values concerning sine and cosine elements, respectively corresponding to the plurality of reception signals; a sine element adder for adding up the predetermined values output from the first output port; and a cosine element adder for adding up the predetermined values output from the second output port.

The plurality of phase demodulators each may comprise: a phase detector for detecting and outputting a phase of the respective one of the plurality of reception signals; a delay for delaying, for one symbol time, data output from the phase detector; and a calculator for calculating a difference between data output from the phase detector and data output from the delay, and outputting a result as a phase difference data.

In these diversity reception devices, a first storage means and a second storage means output predetermined values if a reception signal and phase data output from phase demodulator are given. Then, by adding up the predetermined values for each reception signal, the received signals are combined to form one signal. Therefore, the reception device of the present invention dispenses with expensive components such as DSP, and comprises only small-scale digital circuits suitable for IC including a memory and an adder.

The converter may comprise: a plurality of first storage means, corresponding to the plurality of reception signals and storing calculation results obtained by a certain calculation on all the combinations of sine of the phase data multiplied by the combination coefficient, for fetching and outputting, upon entering of the phase data and the combination coefficient, one of the calculation results stored in a place specified by a combination of the phase data as a first address and the combination coefficient as a second address; and a plurality of second storage means, corresponding to the plurality of reception signals and storing calculation results obtained by a certain calculation on all the combinations of cosine of the phase data multiplied by the combination coefficient, for fetching and outputting, upon entering of the phase data and the combination coefficient, one of the calculation results stored in a place specified by a combination of the phase data as a first address and the combination coefficient as a second address.

The convertor may comprise: a first storage means for storing calculation results obtained by a certain calculation on all the combinations of sine of the phase data multiplied by the combination coefficient, for fetching and outputting, upon entering of the phase data and the combination coefficient, one of the calculation results stored in a place specified by a combination of the phase data as a first address and the combination coefficient as a second address; a second storage means for storing calculation results obtained by a certain calculation on all the combinations of cosine of the phase data multiplied by the combination coefficient, for fetching and outputting, upon entering of the phase data and the combination coefficient, one of the calculation results stored in a place specified by a combination of the phase data as a first address and the combination coefficient as a second address; a phase selector containing a plurality of input ports connected to the plurality of phase demodulator, and an output port connected to the first storage and to the second storage, for selecting an item of phase data according to a certain instruction out of the phase data input to the plurality of input ports, and outputting the piece of phase data to the output port; a combination coefficient selector containing a plurality of input ports which receive a plurality of combination coefficients, and an output port connected to the first storage and to the second storage, for selecting a combination coefficient according to a certain instruction out of the plurality of combination coefficients input to the plurality of input ports, and outputting the combination coefficient to the output port; and a timing generator for providing instructions to the phase selector and the combination coefficient selector so that each of the plurality of reception signals is selected sequentially by time division and that the phase data and the combination coefficient of each of the plurality of reception signals are sent synchronously to the first storage means and the second storage means respectively.

The first storage means may store calculated results of sine of the phase data multiplied by the combination coefficient raised to a power of 2, and the second storage stores calculated results of cosine of the phase data multiplied by the combination coefficient raised to the power of 2.

In the diversity reception device of the present invention, a plurality of signals are combined by a first storage means and a second storage means with a method of selecting the signals one-by-one. This enables minimization of the size and the cost of the diversity reception device.

Another object of the present invention is to provide a diversity reception device which combines a plurality of signals avoiding the influence of interference waves, such as a like delay wave, and outputs a high-quality signal.

The diversity reception device may further comprise: a plurality of comparators, corresponding to the plurality of reception signals and containing an input port and an output port, for comparing a reception level input to the input port consisting of a predetermined number of bits with a predetermined value, and outputting a result from the outputting port; a plurality of likelihood detectors, corresponding to the plurality of reception signals, for detecting a distance between the phase data and a decision point, and outputting the distance; and a plurality of outputs, corresponding to the plurality of reception signals, for outputting the reception level as the combination coefficient if the result output from the plurality of comparators shows that the reception level is less than the predetermined value, and outputting, as the combination coefficient, a predetermined value based on the distance output from the plurality of likelihood detectors multiplied by the reception level if the result shows that the reception level is not less than the predetermined value.

The diversity reception device may further comprise: a plurality of comparator, corresponding to the plurality of reception signals and containing an input port and an output port, for comparing a reception level input to the input port consisting of a predetermined number of bits with a predetermined value, and outputting a result from the outputting port; a plurality of likelihood detectors, corresponding to the plurality of reception signals, for detecting a distance between the phase data and a decision point, and outputting the distance; and a plurality of outputs, corresponding to the plurality of reception signals, for outputting the reception level as the combination coefficient if the result output from the plurality of comparators shows that the reception level is less than the predetermined value, and outputting, as the combination coefficient, a predetermined value based on the distance output from the plurality of likelihood detectors multiplied by the reception level if the result shows that the reception level is not less than the predetermined value.

The first storage means may store calculated results of sine of the phase data multiplied by the combination coefficient, and the second storage means stores calculated results of cosine of the phase data multiplied by the combination coefficient.

The diversity reception device may further comprise: a plurality of combination coefficient calculators, corresponding to the plurality of reception signals, for detecting the distance between the phase data and the decision point, and outputting, as the combination coefficient, a value obtained by performing a certain calculation on the detected distance.

The present diversity reception devices detect the strength of the interference wave in each reception signal by a likelihood detector, and, based on the strength, determine how much each signal should be weighted. Unnecessary influences of an interference wave can be eliminated by setting such a condition that the bigger is the influence of the interference wave in a received signal, the less weighted is the signal when combined.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 3:
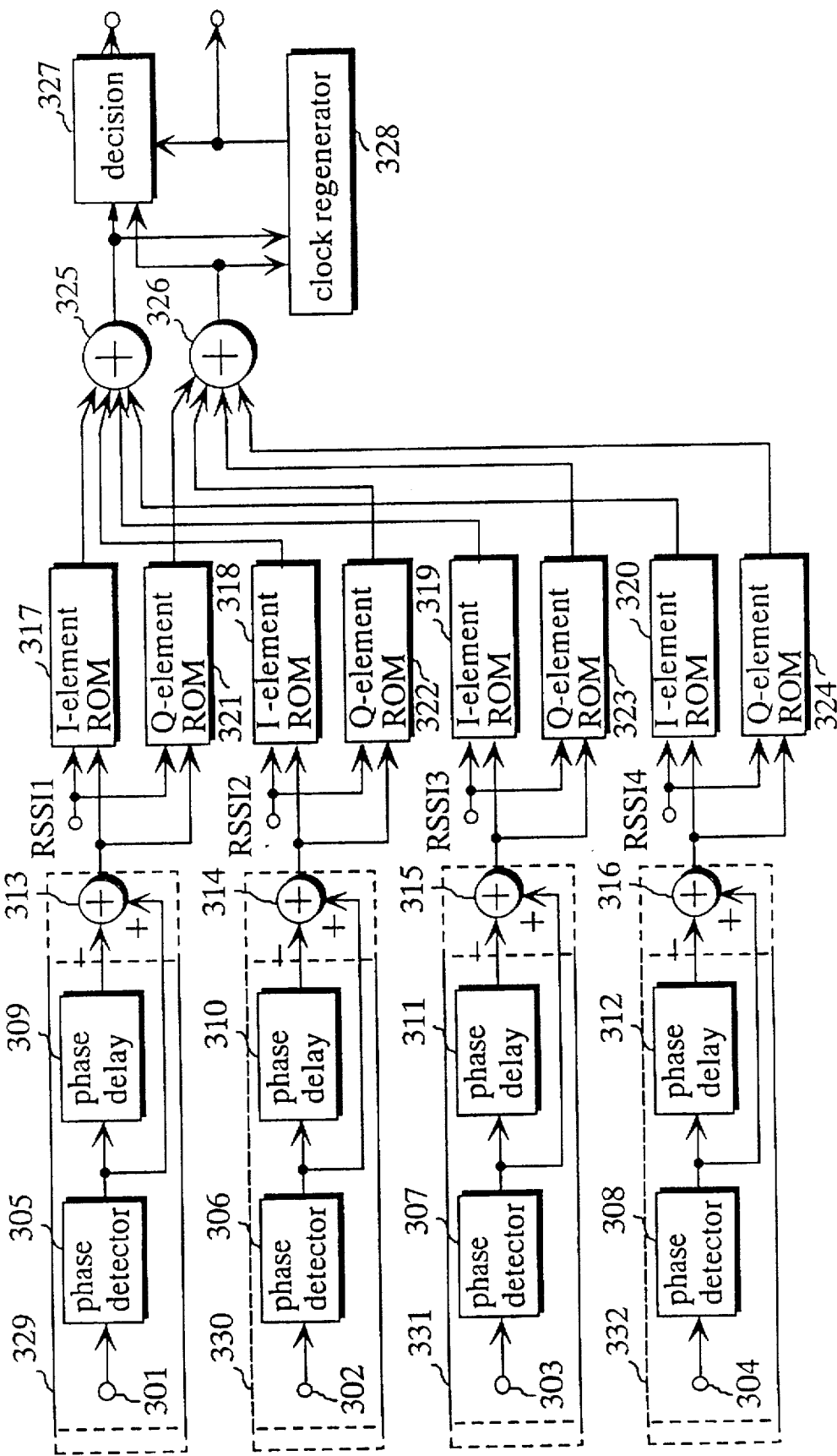
FIG. 3 is a block diagram illustrating the configuration of a diversity reception device in the first embodiment of the present invention.

FIG. 3 illustrates the configuration of a diversity reception device with MRC in the first embodiment of a present invention. The device comprises phase demodulators 329–332, I-element ROMs 317–320, Q-element ROMs 321–324, I-element adder 325, Q-element adder 326, decision 327, and clock regenerator 328.

Phase demodulators 329–332 comprise input terminals 301–304, phase detectors 305–308, phase delays 309–312, and phase adders 313–316, respectively, wherein each as a whole is a differential detector in a phase-detector type of Differential Phase Shift Keying (DPSK) modulation method.

Input terminals 301–304 are terminals through which received signals are input to the present device after being digitized by an A/D converter or a limiter.

Phase detectors 305–308 output digital detected phases after comparing the phases of the signals input through input terminals 301–304 with the phase of the local oscillator that is not shown in the drawings. Thus, phase detectors 305–308 do not require any linear amplifier because the amplitude element of the received signal is not necessary.

Phase delays 309–312 delay the detected phases output from phase detectors 305–308 by one symbolic time and output the delayed phases. By one symbolic time indicates a time obtained from the period of the received signal multiplied by the exponent of 2 of the polyphase PSK (e.g., 2 for 4 phases ($2^2$), and 3 for 8 phases ($2^3$)).

Phase adders 313–316 calculate the phase differences between the detected phases and the delayed phases and output the results as the phase data. Phase data $\theta k$ corresponding to each branch (kth branch) is obtained from the phase data.

I-element adder 325 totals the values output from I-element ROMs 317–320. Q-element adder 326 totals the values output from Q-element ROMs 321–324.

Decision 327, synchronized with the clock signal sent from clock regenerator 328, synthesizes a vector from the values from I-element adder 325 and Q-element adder 326, decides whether the result value is greater or smaller than the preset threshold value, and outputs the decision result as decoded data.

Clock regenerator 328 regenerates the clock signal synchronized with the data from I-element adder 325 and Q-element adder 326, and sends the clock signal to decision 327.

Now, the present device is descrbed in terms of combing signals.

Figure 1:
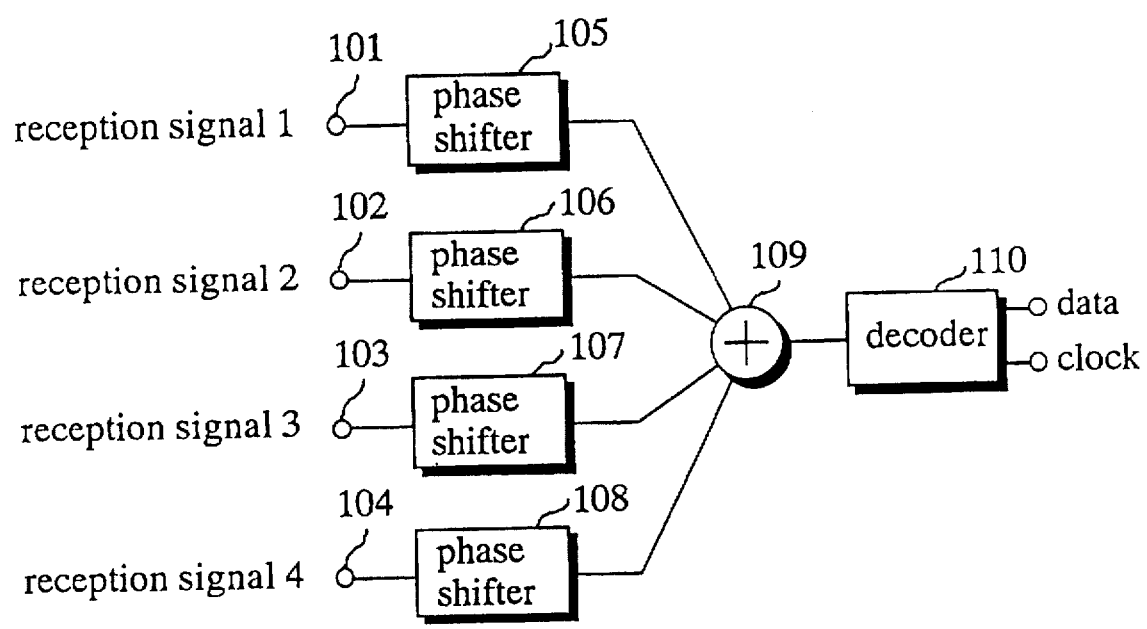
FIG. 1 is a block diagram illustrating the configuration of a conventional diversity reception device.
Figure 2:
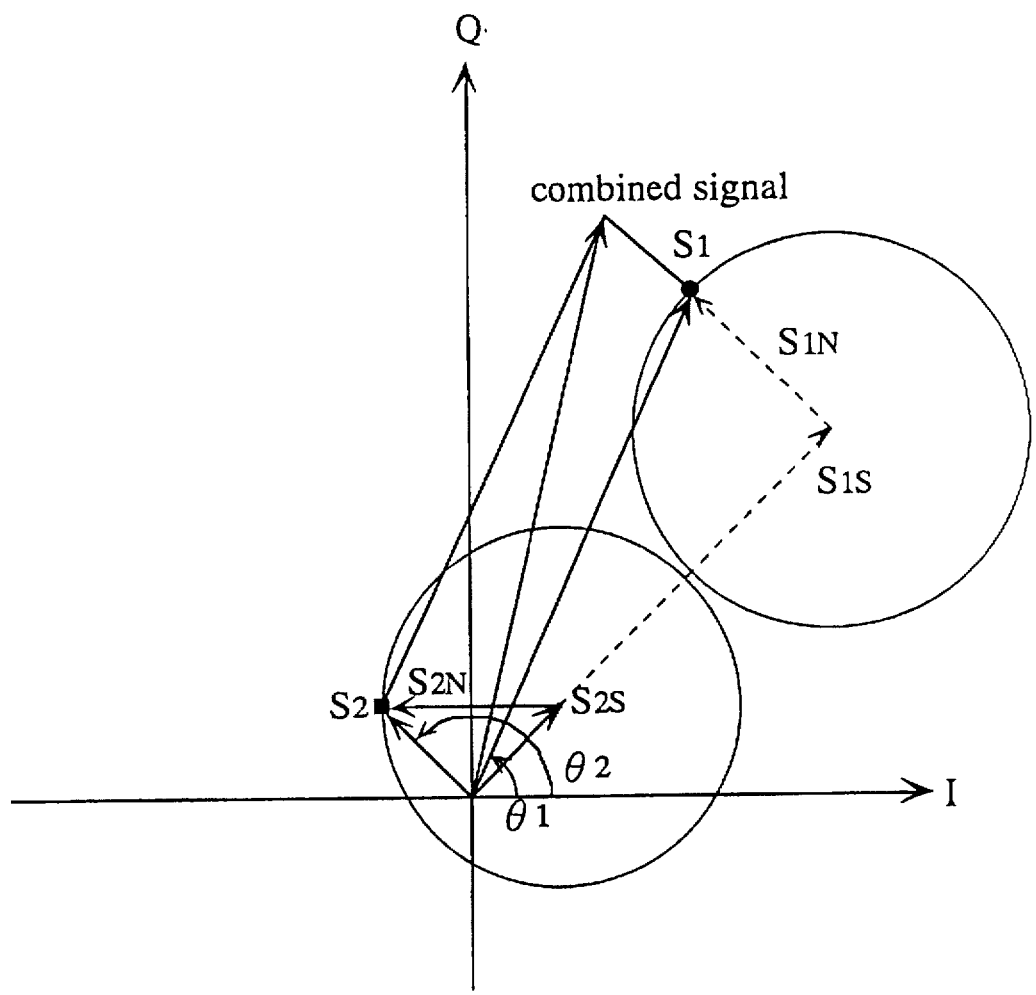
FIG. 2 is an IQ plane figure expressing a signal combination in a conventional diversity reception device.
Figure 4:
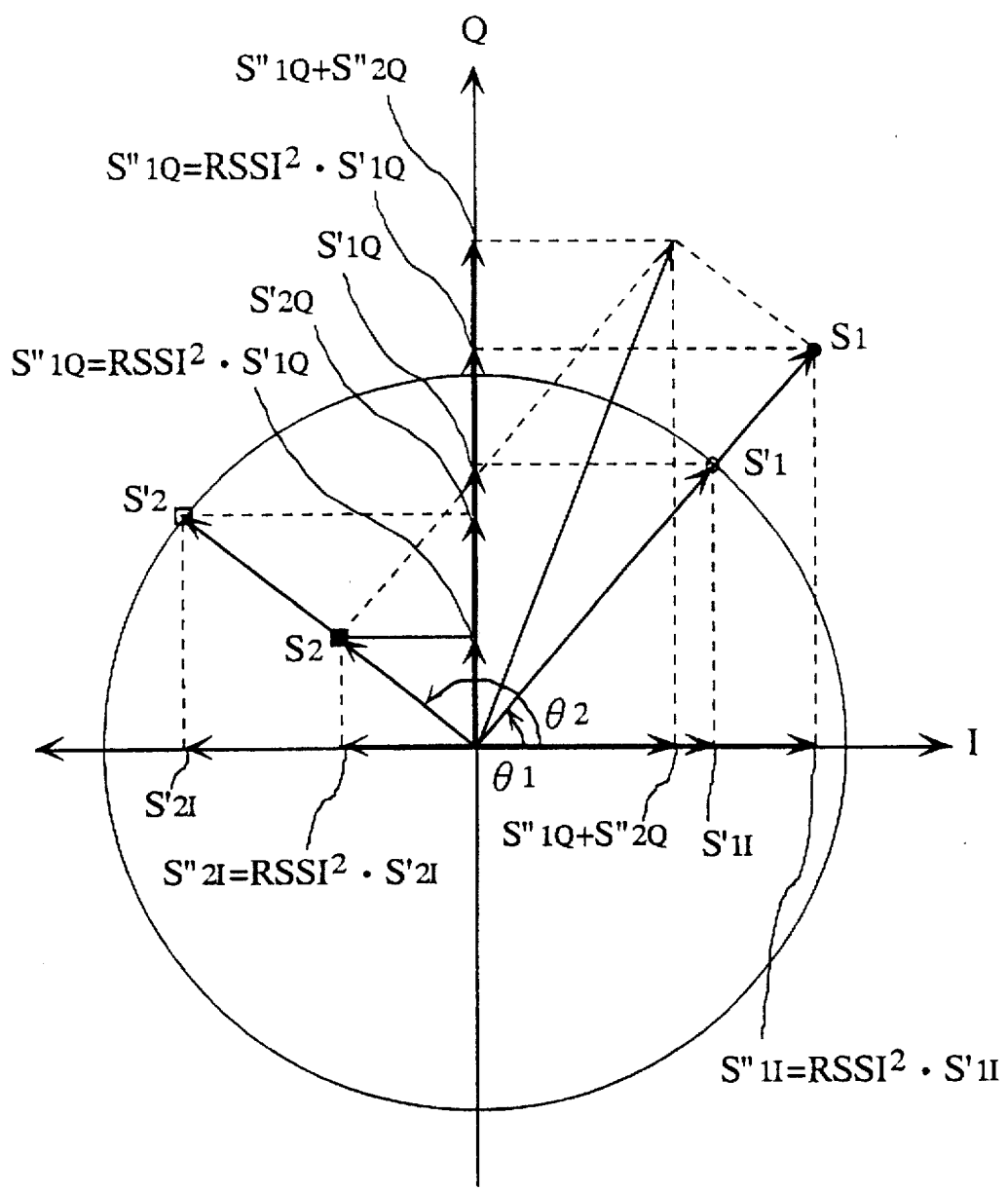
FIG. 4 is an IQ plane figure expressing a signal combination in the diversity reception device in the first embodiment of the present invention.

FIG. 4 is an IQ plane figure showing signals S1 and S2 input to the diversity reception device of FIG. 1 and the combined signal by the present invention. For the sake of convenience, only two received signals (S1 and S2) are selected for this figure.

Phase demodulators 329 and 330 are differential detectors of a phase detection type. Therefore, signals S'1 and S'2 output from the above phase demodulators contain only $\theta 1$ and $\theta 2$ which are phase data of the received signals, and have no amplitude data. Since the signals S'1 and S'2 have the same size, on the IQ plane, they are represented as points on the circumference whose center is the origin, as $$S'1I = \cos \theta 1$$

$$S'1Q = \sin \theta 1$$

$$S'2I = \cos \theta 2$$

$$S'2Q = \sin \theta 2.$$

These phase data $\theta 1$ and $\theta 2$ are sent to I-element ROMs 317 and 318 and Q-element ROMs 321 and 322.

I-element ROMs 317 and 318 receive phase data $\theta 1$ and $\theta 2$ and reception level RSSI, weight on the cosine elements of S'1 and S'2 with $RSSI^2$, respectively, and output the result values S"1I and S"2I, as $$S"1I = RSSI^2 \cdot \cos \theta 1 = RSSI^2 \cdot S'1I$$

$$S"2I = RSSI^2 \cdot \cos \theta 2 = RSSI^2 \cdot S'2I.$$

Similarly, Q-element ROMs 321 and 324, upon receiving phase data $\theta 1$ and $\theta 2$ and reception level RSSI, weight the sine elements of S'1 and S'2 with $RSSI^2$ with respectively, and output the result values S"1Q and S"2Q, as $$S"1Q = RSSI^2 \cdot \sin \theta 1 = RSSI^2 \cdot S'1Q$$

$$S"2Q = RSSI^2 \cdot \sin \theta 2 = RSSI^2 \cdot S'2Q.$$

Then, I-element adder 325 obtains I-element of the combined signal by adding S"1I and S"2I, represented as I-element of combined signal = S"1I + S"2I.

Similarly, Q-element adder 326 obtains Q-element of the combined signal by adding S"1Q and S"2Q, represented as Q-element of combined signal = S"1Q + S"2Q.

With the above implementation, the combined signal by MRC is obtained, and decision 327, the final step, decodes the signal.

An explanation is given below regarding why $RSSI^2$ is used as the weight coefficient when reception signals are combined.

Suppose the complex envelope of a signal received in k th branch at t=nT is Zk(n), then MRC diversity output VMRC (n) is represented as $$VMRC(n) = \Sigma Zk(n) \cdot Zk^*(n-1),$$

where * indicates the complex conjugate. Zk(n−1) indicates a signal one symbol before Zk(n).

Here, phase data VDDk of each branch is represented as $$VDDk = Zk(n) \cdot Zk^*(n-1)/|Zk(n) \cdot Zk^*(n-1)|.$$

Hence, $$VMRC(n) = \Sigma VDDk \cdot |Zk(n)||Zk^*(n-1)|.$$

Here, $$|Zk(n)| = |Zk^*(n-1)|.$$

Therefore, $$VMRC(n) = \Sigma VDDk \cdot |Zk(n)|^2.$$

Consequently, MRC diversity output VMRC(n) is obtained with $|Zk(n)|^2$, replaceable with $RSSI^2$, as the weight coefficient on phase data VDDk.

As the above description clarifies, MRC diversity reception device of the present invention is be composed with such small digital circuits suitable for IC as memory, adder, and shift register, dispensing with expensive DSP and the like. Furthermore, this invention realizes the non-linear amplification that may use a very simple composition on a radio circuit because a signal input to the present device need not be linear. These elements have a multiplier effect to decrease the cost of the components of the current device, and decrease the cost of the radio equipment as a whole.

Figure 5:
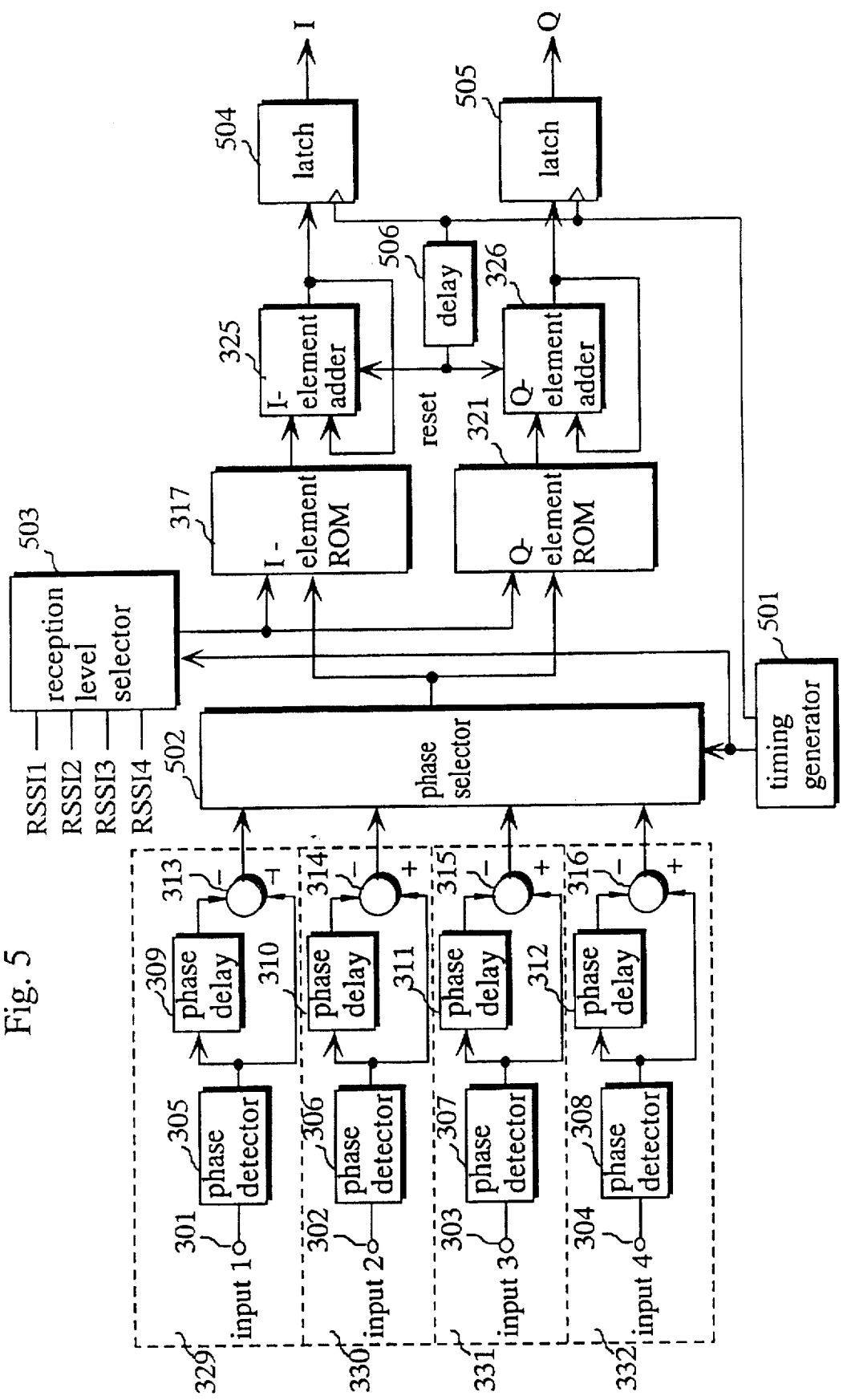
FIG. 5 is a block diagram illustrating the configuration of a diversity reception device in the second embodiment of the present invention.

FIG. 5 is a block diagram illustrating the configuration of the MRC diversity reception device in second embodiment of the invention. The present device of the second embodiment differs from the diversity reception device of the first embodiment in that only two ROMs, I-element ROM 317 and Q-element ROM 321, are provided to cover all four branches. The same components as those in the first embodiment have the same numbers in FIG. 5.

The present device differs from the diversity reception device of the first embodiment in that the present device additionally has timing generator 501, phase selector 502, reception level selector 503, latches 504 and 505, and delay 506.

Phase selector 502 sequentially selects phase data sent from phase demodulators 329-332 synchronously with the clock signal sent from timing generator 501, receives phase data from the phase demodulator, and sends it to I-element ROM 317 and Q-element ROM 321.

Similarly, reception level selector 503 sequentially selects an input port out of a plurality of input ports in 503 with the clock signal sent from timing generator 501, receives the reception level of the signal input in the port, and sends it to I-element ROM 317 and Q-element ROM 321. Phase selector 502 and reception level selector 503 select the same branch at the same timing according to the clock signal.

I-element ROM 317 and Q-element ROM 321 output I-element and Q-element of each reception signal to I-element adder 325 and Q-element adder 326 respectively. 325 and 326 accumulate and add up four elements, and the results are stored in latches 504 and 505 respectively. Then, 325 and 326 are reset by the clock signal sent from delay 506.

In this way, phase data and reception levels of four branches of the same reception signal are sent to I-element ROM 317 and Q-element ROM 321 respectively by time division, and the same combined signal as that of the first embodiment is obtained at last.

As understood from the above process, while the device of the first embodiment requires as many I-element ROMs and Q-element ROMs as there are branches, the device of the present embodiment has only one ROM for each element of the branch to achieve the same performance. This results in an even smaller and power-efficient device with a smaller electric power consumption than that of the first embodiment.

Figure 6:
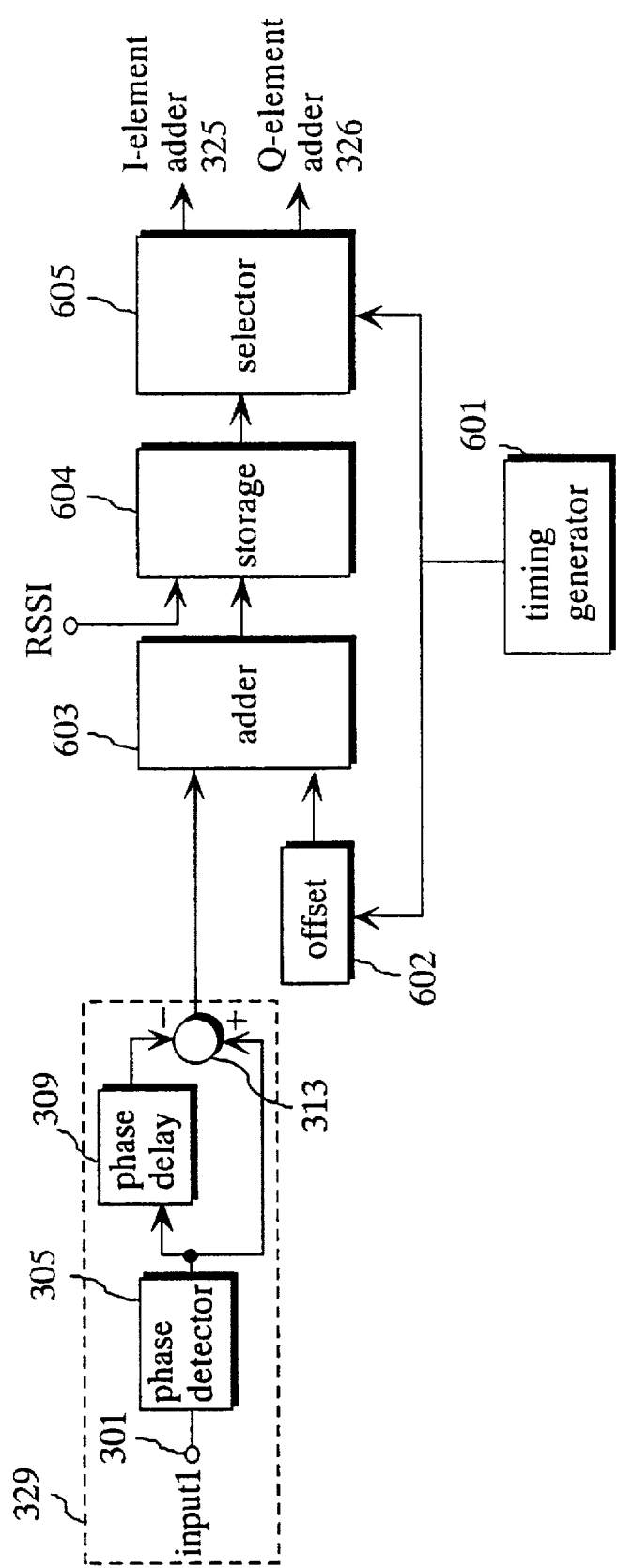
FIG. 6 is a block diagram illustrating the configuration of a branch of a diversity reception device in the third embodiment of the present invention.

FIG. 6 is a block diagram illustrating the configuration of a branch of the MRC diversity reception device in the third embodiment of the present invention.

The present device differs from the diversity reception devices of the first and second embodiments in that the present device additionally has timing generator 601, offset 602, adder 603, and selector 605, and that two ROMs are replaced by storage 604.

Offset 602 and selector 605 operate synchronously according to the clock signal sent from timing generator 601.

This enables the operational values corresponding to I-element and Q-element stored in storage 604 to be fetched alternately by time division and sent to I-element adder 325 and Q-element adder 326 respectively.

Offset 602 outputs two values of offset data according to the clock signal sent from timing generator 601. If N bits of data are input in adder 603, the data from 0 to $(2^N-1)$ correspond to phases from 0° to 360°. Therefore, two values with difference $2^{N-2}$ are output as offset data from offset 602 using the relation of $\cos\theta = \sin(\theta+90°)$.

For example, if N=8, any of such combinations as 0 and 64, 64 and 128, 128 and 192 and the like is output from offset 602.

Adder 603 adds the above offset data to the phase data of each branch, and sends the result value to an address in storage 604.

In this way, the operational values corresponding to I-element and Q-element stored in storage 604 are fetched alternately by time division and are used to calculate I-element and Q-element of the received signal.

As is apparent from the above description, while the device in the first and second embodiments require I-element ROM and Q-element ROM, the device in the present embodiment uses only one ROM to achieve the same performance. This results in an even smaller and power-effeicient device with a smaller electric power consumption than those of the first and second embodiments.

Figure 7:
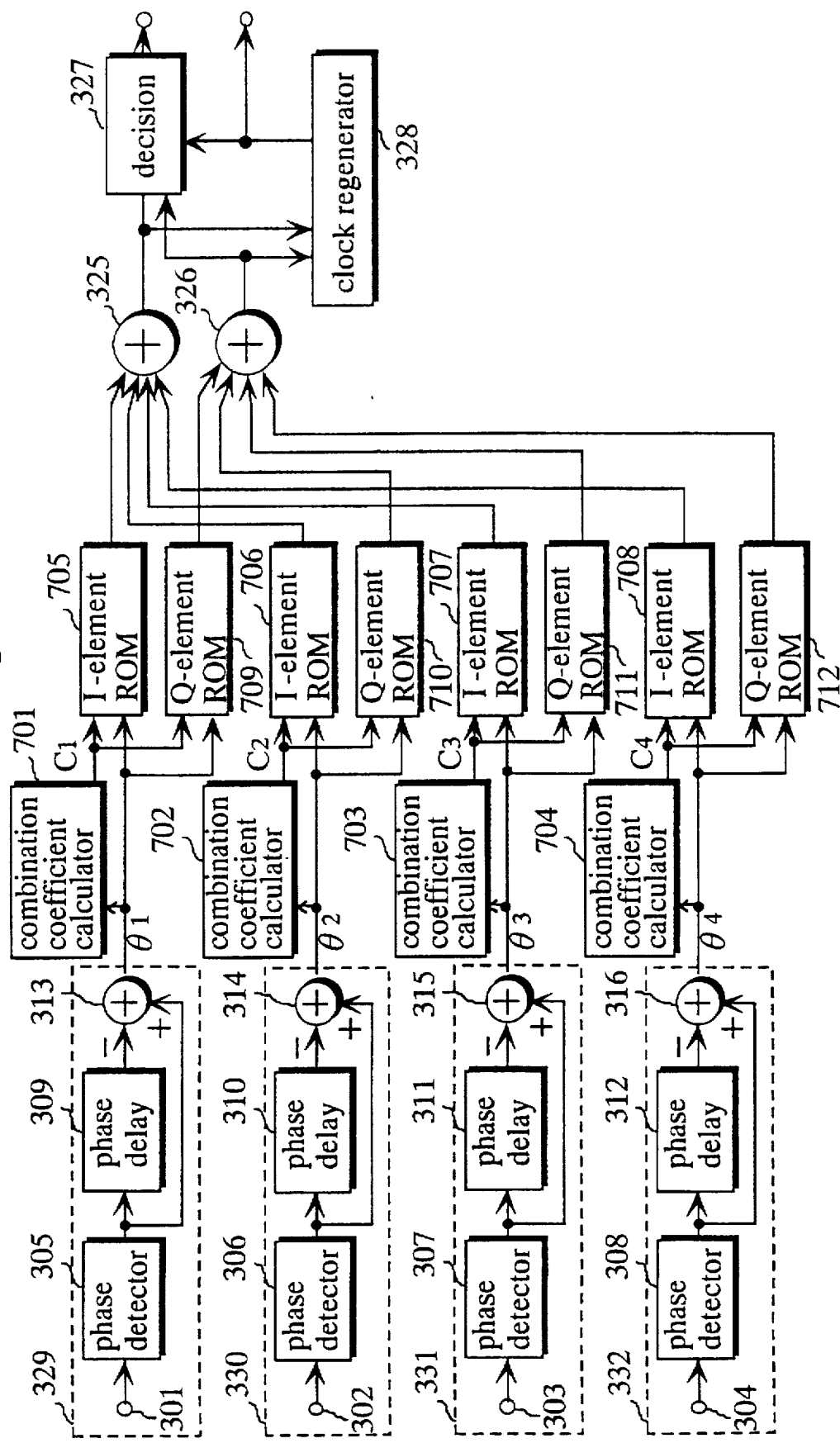
FIG. 7 is a block diagram illustrating the configuration of a diversity reception device in the fourth embodiment of the present invention.

FIG. 7 is a block diagram illustrating the configuration of a diversity reception device of the fourth embodiment of the present invention.

The device differs from the diversity reception device of the first embodiment in that the present device additionally has combination coefficient calculators 701-704, and that I-element ROMs 705-708 and Q-element ROMs 709-712 operate differently. The same components as those in the first embodiment appear in FIG. 7, having the same numbers, and are not explained here.

Combination coefficient calculators 701-704 are ROMs storing combination coefficient values which are obtained by calculating all the possible distances between the decision point and the phase data. When phase data is input from a phase demodulator 329, 330, 331, or 332 as an address to a respective combination coefficient calculator 701, 702, 703, or 704, combination coefficient Ck that corresponds to a distance between the decision point and the phase data is output.

Figure 8:
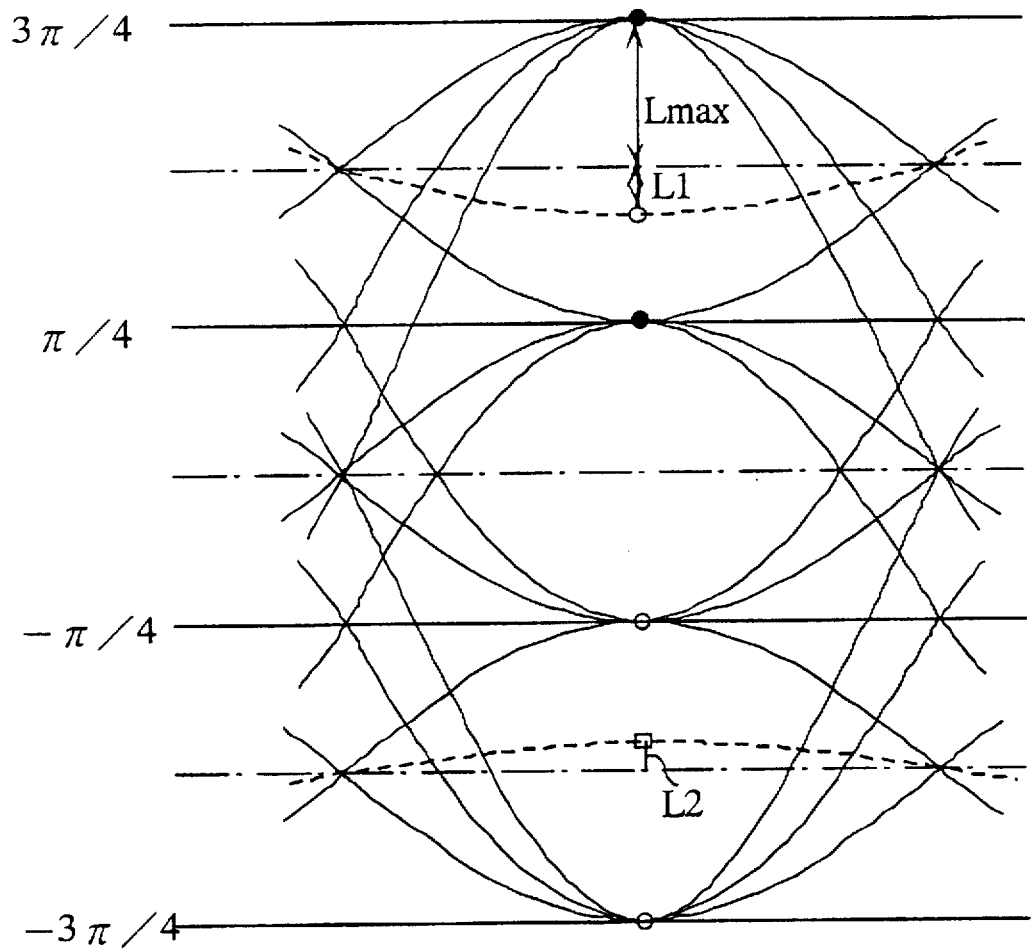
FIG. 8 shows the eye-pattern of phase data output from phase demodulators 329–332 of a diversity reception device in the fourth embodiment of the present invention.

FIG. 8 shows the eye-pattern of phase data at π/4 shift QPSK. It shows modulated phases of the phase data taken synchronously. Distances L1 and L2 each indicate the likelihood of the decision point of each phase against the ideal decision point. The greater the distance, the closer the signal is to the ideal, that is, the lower the rate of interference wave included in the reception signal is. Combination coefficient calculators 701–704 output distances L1 ($\geq 0$) and L2 ($\geq 0$) obtained by calculating the predetermined function f(x), as $$C1=f(L1)$$

$$C2=f(L2).$$

f(x) is determined based on the degree of the effect of the interference wave taken into account when the received signal is combined. For example, when the received signal is combined with the first-degree weight for the effect of the interference wave, it can be determined as $$C1=L1$$

$$C2=L2.$$

I-element ROMs 705–708 store operational values of $Ck \cdot \cos\theta k$ for all the combinations of combination coefficient Ck and phase data θk. When combination coefficient Ck and phase data θk as addresses are input from combination coefficient calculators 701–704 and phase adders 313–316 respectively, I-element ROMs 705–708 output a calculation result of $Ck \cdot \cos\theta k$ corresponding to the combination.

Similarly, Q-element ROMs 709–712 store operational values of $Ck \cdot \sin\theta k$ for all the combinations of combination coefficient Ck and phase data θk. When combination coefficient Ck and phase data θk as addresses are input from combination coefficient calculators 701–704 and phase adders 313–316 respectively I-element ROMs 709–712 output calculation result of $Ck \cdot \sin\theta k$ corresponding to the combination.

Now the present device is described in terms of combing signals.

Figure 9:
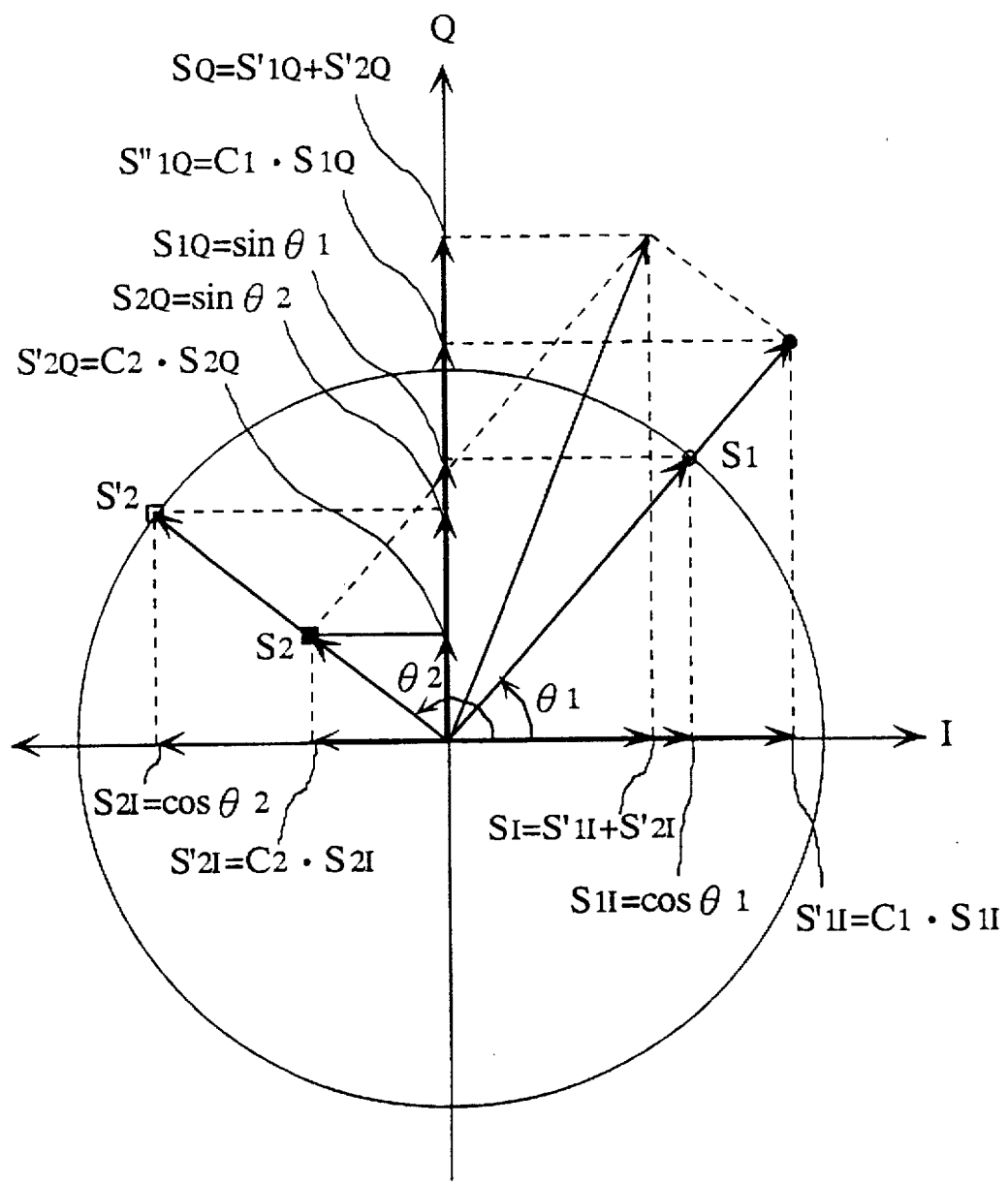
FIG. 9 is an IQ plane figure expressing a signal combination in the diversity reception device in the fourth embodiment of the present invention.

FIG. 9 is an IQ plane figure showing received signals and a combined signal obtained by the present device. For the sake of convenience, only two received signals are shown in this figure.

Phase demodulators 329 and 330 are differential detector of the phase detection type. Therefore, signals S1 and S2 output from the above phase demodulators contain only θ1 and θ2 which are phase data of the received signals, and have no amplitude data. Since the signals S1 and S2 have the same size, on the IQ plane, they are represented as points on the same circumference whose center is the origin. These phase data θ1 and θ2 are sent to combination coefficient calculators 701 and 702, I-element ROMs 705 and 706, and Q-element ROMs 709 and 710.

Combination coefficient calculators 701 and 702 calculate combination coefficients C1 and C2 which are weights used in combining received signals, and send the results to I-element ROMs 705 and 706, and Q-element ROMs 709 and 710.

I-element ROMs 705 and 706, upon receiving phase data θ1 and θ2 and combination coefficients C1 and C2, weight combination coefficients C1 and C2 on the cosine elements of phase data θ1 and θ2, and output the result values S'1I and S'2I, as $$S'1I=C1 \cdot \cos\theta 1$$

$$S'2I=C2 \cdot \cos\theta 2.$$

Q-element ROMs 709 and 710, upon receiving phase data θ1 and θ2 and combination coefficients C1 and C2, weight combination coefficients C1 and C2 on the sine elements of phase data θ1 and θ2, and output the result values S'1Q and S'2Q, as $$S'1Q=C1 \cdot \sin\theta 1$$

$$S'2Q=C2 \cdot \sin\theta 2.$$

Then, I-element adder 325 obtains I-element of the combined signal by adding S'1I and S'2I, as $$I\text{-element of combined signal}=S'1I+S'2I.$$

Similarly, Q-element adder 326 obtains Q-element of the combined signal by adding S'1Q and S'2Q, as $$Q\text{-element of combined signal}=S'1Q+S'2Q.$$

With the above implementation, I-element and Q-element of the combined signal is obtained, and decision 327, in a final step, decodes the signal data.

As the above description clarifies, the MRC diversity reception device of the present invention is composed of such small digital circuits suitable for IC as memory, adder, and shift register, dispensing with expensive DSP and the like.

Furthermore, the device of the present embodiment differs from MRC device in that it obtains a combined signal by weighting it with a coefficient based on the distance of the phase data not by weighting the reception signal level. In this way, the present device can remove the effect of an interference wave because it assigns less weight to a reception signal when a stronger interference wave is included in the reception signal.

Figure 10:
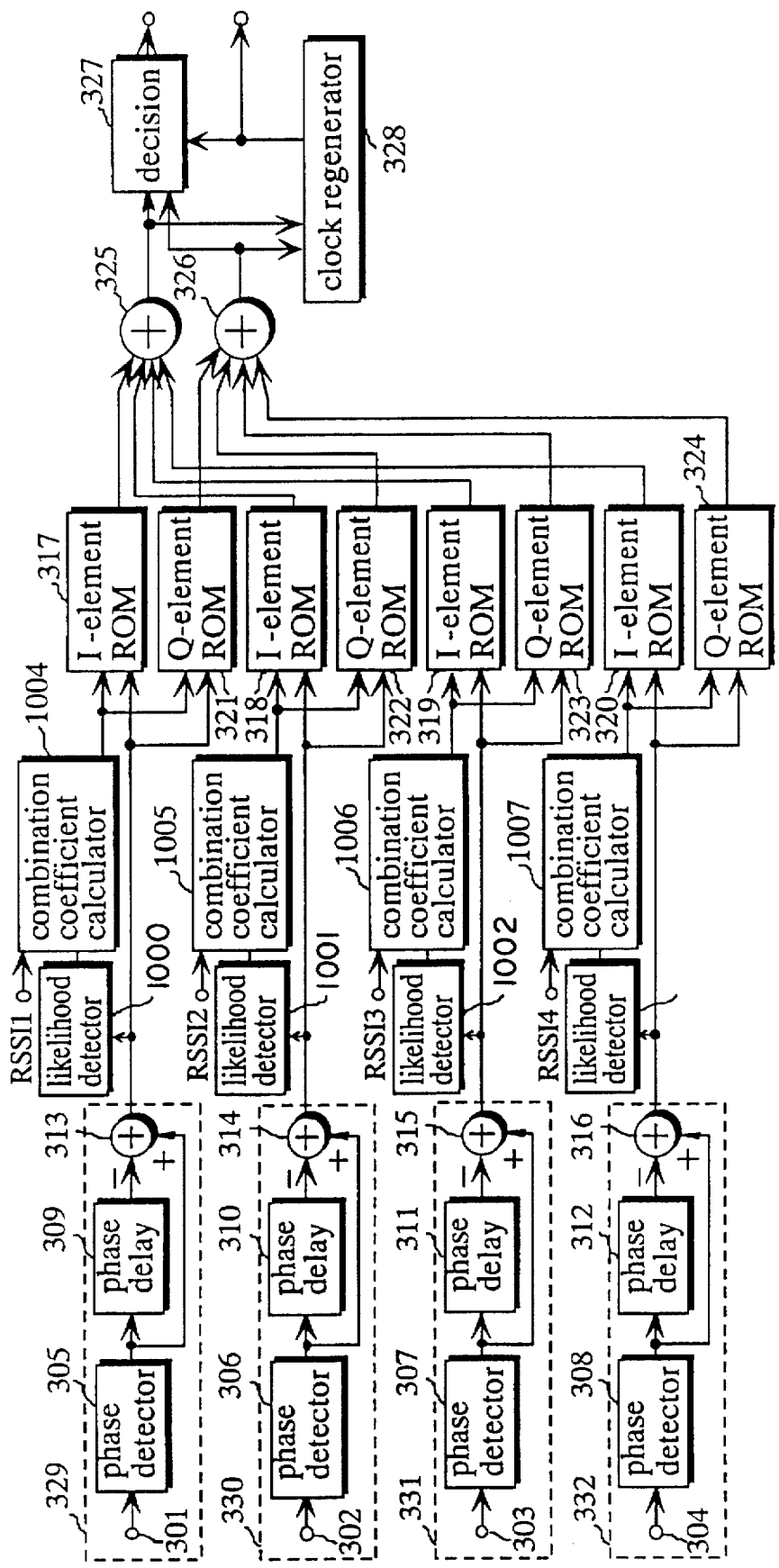
FIG. 10 is a block diagram illustrating the configuration of a diversity reception device in the fifth embodiment of the present invention.

FIG. 10 is a block diagram illustrating the configuration of a diversity reception device in the fifth embodiment of the present invention.

The device of the fifth embodiment differs from the diversity reception device of the first embodiment in that the present device additionally has likelihood detectors 1000–1003 and combination coefficient calculators 1004–1007. The same components as those in the first embodiment appear in FIG. 10, having the same numbers, and are not explained here.

Likelihood detectors 1000–1003 detect the distance between the decision point and phase data output from phase demodulators 329–332, and send the results to combination coefficient calculators 1004–1007.

Figure 11:
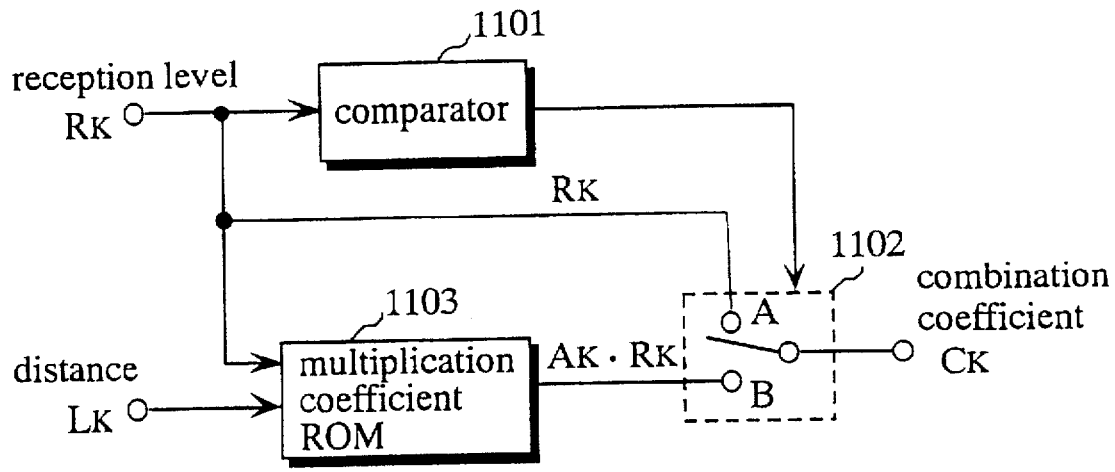
FIG. 11 is a block diagram illustrating the configuration of combination coefficient controllers 1004–1007 of the diversity reception device in the fifth embodiment of the present invention.

Each of combination coefficient calculators 1004–1007 is composed of, as shown in FIG. 11, comparator 1101, multiplication coefficient ROM 1103, and converter 1102.

Comparator 1101 including an input port and an output port, compares a reception level consisting of the predetermined number of bits input to the input port with the predetermined value stored inside comparator 1101 itself and output the result from the output port.

Multiplication coefficient ROM 1103 stores predetermined values of multiplication Ak·Rk which cover all the combinations of multiplication coefficient Ak, which is determined by distance Lk, and reception level Rk. Multiplication coefficient ROM 1103 selects a calculation result of Ak·Rk if distance Lk and reception level Rk are input as addresses, and send the selected value to converter 1102.

Converter 1102, according to the output result of the comparator 1101, selects reception level Rk or Ak·Rk output from multiplication coefficient ROM 1103, and outputs the result as combination coefficient Ck.

Given below is one explanation of the operation in obtaining the combined signal in the present device, mainly the operation of combination coefficient calculators 1004-1007 shown in FIG. 10.

Figure 12:
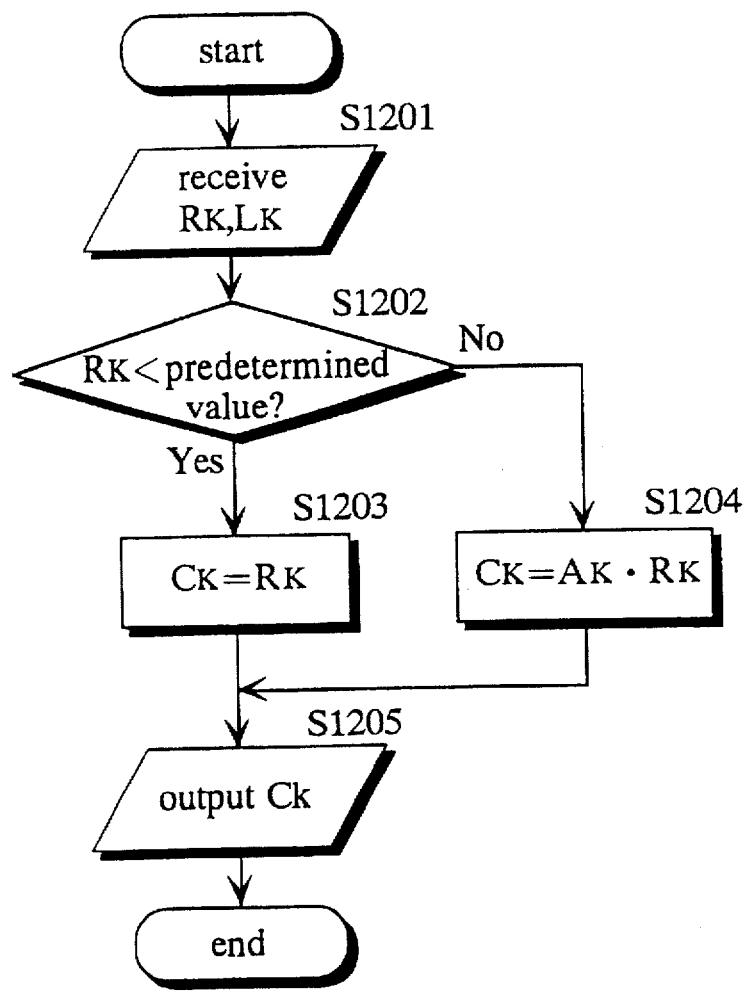
FIG. 12 is a flowchart illustrating the operation of combination coefficient controllers 1004–1007 of the diversity reception device in the fifth embodiment of the present invention.

FIG. 12 is a flowchart illustrating the operation of combination coefficient calculators 1004-1007.

Firstly, reception level Rk and distance Lk are input to combination coefficient calculators 1004-1007 (step S1201), then comparator 1101 compares reception level Rk and the predetermined value (step S1202).

If reception level Rk is smaller than the predetermined value, converter 1102 selects contact A and outputs reception level Rk as combination coefficient Ck (steps S1203 and S1205). If reception level Rk is small, it means that the S/N ratio is poor. In that case, even if distance Lk is short, it cannot be said that it is due to the effect of an interference wave. Therefore, when reception level Rk is small, the combination signal is obtained by weighting only reception level Rk without considering distance Lk. That means a branch with small reception level Rk is treated the same as that in MRC diversity device.

On the other hand, if reception level Rk is greater than the predetermined value, converter 1102 selects contact B and outputs Ak·Rk, output from multiplication coefficient ROM 1103, as combination coefficient Ck (steps S1204 and S1205).

Multiplication coefficient Ak is obtained by calculating the predetermined function f'(x) with distance Lk, as $$Ak = f'(Lk).$$

Here, f'(x) operates under the following conditions: multiplication coefficient Ak=1 if distance Lk is greater than the predetermined value; and
$0 \leq Ak < 1$ if distance Lk is smaller than the predetermined value.

Accordingly, when reception level Rk is large, which is to say S/N ratio is good, and distance Lk is great, which is to say there is no interference wave, multiplication coefficient Ak=1, which is to say combination coefficient Ck=Rk. That means a branch without an interference wave is treated the same as that in an MRC diversity device.

On the other hand, Ak takes a small value if reception level Rk is greater and S/N ratio is good and Lk is small and there is strong interference wave. That means a branch with a strong interference wave has a small combination coefficient, and the effect of an interference wave is decreased.

Thus the present device works as an MRC diversity device if the comparator uses a predetermined comparison value Rk as its maximum, and that it works as a diversity device which weights multiplication coefficient if the comparator uses Rk as its minimum.

As is apparent from the above description, the present device is composed of small digital circuits suitable for IC as memory, adder, and shift register, dispensing with expensive DSP and the like. And the cost down of the whole radio equipment is possible with the present device.

Furthermore, the device of the present embodiment differs from an MRC device in that it obtains a combined signal by weighting it with a coefficient based on the distance of the phase data by not weighting the reception signal level. In this way, the present device can remove the effect of an interference wave because it weights a reception signal less when a stronger interference wave is included in the reception signal. Accordingly, the present signal combination method provides a better combination signals than the conventional MRC methods.

The above embodiments are provided to help understand the diversity reception device by the present invention. It is apparent, however, that the embodiment of the present invention is not limited to the above embodiments. The following are examples of the possible applications:

(1) All the five embodiments above have four branches. However, the number of branches is not limited to four. For example, two or eight branches can be used with almost the same composition in the present diversity reception device.

(2) ROMs used for combination coefficient calculators 701-704 in the fourth embodiment can be united with I-elements 705-708, and Q-elements 709-712, for example, the most significant bit addresses of I-element ROMs 705-708 and Q-element ROMs 709-712 may have the distances between the decision point and the phase data and the least significant bit addresses of these ROMs may have the phase data, so that the calculation results are fetched from the addresses.

Although the present invention has been fully described by way of examples with reference to the accompanying drawings, it is to be noted that various changes and modifications will be apparent to those skilled in the art. Therefore, such changes and modifications should be construed as being included therein.

What is claimed is:

1. A diversity reception device for weighting and combining a plurality of reception signals, comprising:

a plurality of phase demodulating means for demodulating a phase of a respective one of said plurality of reception signals and outputting phase data;

a converting means, having at least one first input port which receives said phase data, at least one second input port which receives a weighting coefficient, a first output port, a second output port, and a storage means, for outputting predetermined values stored in a place in said storage means specified by a combination of said phase data and said weighting coefficient, from said first output port and second output port upon input of said phase data and said weighting coefficient, said predetermined values concerning respectively sine elements and cosine elements corresponding to said plurality of reception signals;

a sine element adding means for adding up said predetermined values output from said first output port; and a cosine element adding means for adding up said predetermined values output from said second output port.

2. The diversity reception device as defined in claim 1, wherein said plurality of phase demodulating means each comprises:

a phase detection means for detecting and outputting a phase of said respective one of said plurality of reception signals;

a delay means for delaying, one symbol time, data output from said phase detection means; and a calculation means for calculating a difference between data output from said phase detection means and data output from said delay means, and outputting a result as a phase difference data.

3. The diversity reception device as defined in claim 2 wherein said storage means comprises:

a first storage means for storing calculation results obtained by a certain calculation on all the combinations of sine of said phase data multiplied by said weighting coefficient, for fetching and outputting, upon entering of said phase data and said weighting coefficient, one of said calculation results stored in a place specified by a combination of said phase data as a first address and said weighting coefficient as a second address; and a second storage means for storing calculation results obtained by a certain calculation on all the combinations of cosine of said phase data multiplied by said weighting coefficient, for fetching and outputting, upon entering of said phase data and said weighting coefficient, one of said calculation results stored in a place specified by a combination of said phase data as a first address and said weighting coefficient as a second address, wherein said converting means further comprises:

a phase selecting means containing a plurality of said first input ports connected to said plurality of phase demodulating means, and a third output port connected to said first storage means and to said second storage means, for selecting a piece of phase data according to a certain instruction out of said phase data input to said plurality of said first input ports, and outputting said piece of phase data to said third output port;

a weighting coefficient selecting means containing a plurality of said second input ports which receive a plurality of weighting coefficients, and a fourth output port connected to said first storage means and to said second storage means, for selecting a weighting coefficient according to a certain instruction out of said plurality of weighting coefficient input to said plurality of second input ports, and outputting said combination coefficient to said fourth output port; and a timing generation means for providing instructions to said phase selecting means and said weighting coefficient selecting means so that each of said plurality of reception signals is selected sequentially by time division and that said phase data and said weighting coefficient of each of said plurality of reception signals are sent synchronously to said first storage means and said second storage means, respectively.

* * * * *